(12) United States Patent
Robieu et al.

(10) Patent No.: US 8,172,003 B2
(45) Date of Patent: May 8, 2012

(54) OVERLOAD PROTECTION DEVICE AND MACHINE TOOL HAVING SUCH OVERLOAD PROTECTION DEVICE

(75) Inventors: Thomas Robieu, Winnenden (DE); Jean-Claude Maret, Chilly-Mazarin (FR)

(73) Assignee: Atlas Copco Electric Tools GmbH, Winnenden (DE)

( * ) Notice: Subject to any disclaimer, the term of this patent is extended or adjusted under 35 U.S.C. 154(b) by 1836 days.

(21) Appl. No.: 10/711,950

(22) Filed: Oct. 15, 2004

(65) Prior Publication Data

US 2006/0084370 A1 Apr. 20, 2006

(51) Int. Cl.
*B23Q 5/02* (2006.01)
*B23Q 5/54* (2006.01)
(52) U.S. Cl. .......................... 173/176; 173/178; 173/179
(58) Field of Classification Search .................... 173/93, 173/93.5, 176, 178, 179; 192/55.1, 56.1; 464/30, 41
See application file for complete search history.

(56) References Cited

U.S. PATENT DOCUMENTS

| 1,611,847 | A | * | 12/1926 | Anderson | 192/105 R |
| 3,283,867 | A | * | 11/1966 | Rice | 192/105 CD |
| 3,329,245 | A | * | 7/1967 | Freber | 192/55.61 |
| 3,810,533 | A | * | 5/1974 | Densow | 192/105 BA |
| 3,982,616 | A | * | 9/1976 | Bidanset | 192/104 C |
| 4,635,777 | A | * | 1/1987 | Nickel et al. | 192/75 |
| 4,669,590 | A | | 6/1987 | Zindler et al. | 192/17 R |
| 5,503,261 | A | * | 4/1996 | Schultz | 192/105 CD |
| 5,653,509 | A | | 8/1997 | Bieri, Jr. | 299/39.3 |
| 2003/0111315 | A1 | | 6/2003 | Kramer | 192/105 |

FOREIGN PATENT DOCUMENTS

| DE | 1 029 646 | 5/1958 |
| DE | 1 221 859 | 7/1966 |
| EP | 0 133 645 | 3/1985 |
| EP | 0 691 180 | 1/1996 |
| EP | 1 470 882 | 10/2004 |
| GB | 480899 | 3/1938 |
| GB | 1095068 | 12/1967 |
| GB | 2 084 268 | 4/1982 |

* cited by examiner

*Primary Examiner* — Rinaldi Rada
*Assistant Examiner* — Nathaniel Chukwurah
(74) *Attorney, Agent, or Firm* — Gudrun E. Huckett

(57) ABSTRACT

A portable device having an overload protection device for motor-operated tools has a drive motor, a drive shaft connected to the drive motor and driven in rotation by the drive motor, and an output shaft for driving a cutting tool, wherein the output shaft is arranged substantially perpendicularly to the drive shaft. A drive pinion is connected to the drive shaft. A drum is supported on the output shaft and driven in rotation by the drive pinion. A coupling is arranged between the drum and the output shaft and engages the drum. The coupling is connected to the output shaft. When the output shaft is blocked, the coupling effects an automatic decoupling between the drum and the output shaft in order to prevent overloading of the drive motor.

9 Claims, 12 Drawing Sheets

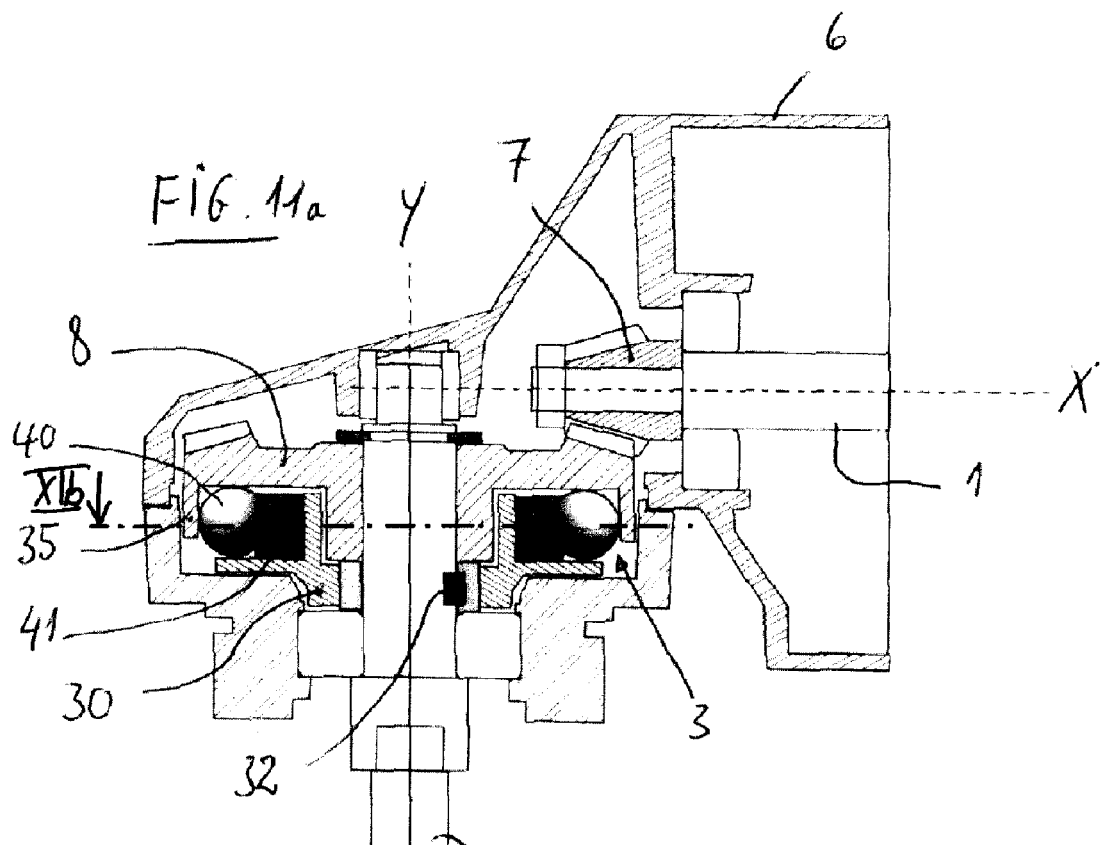
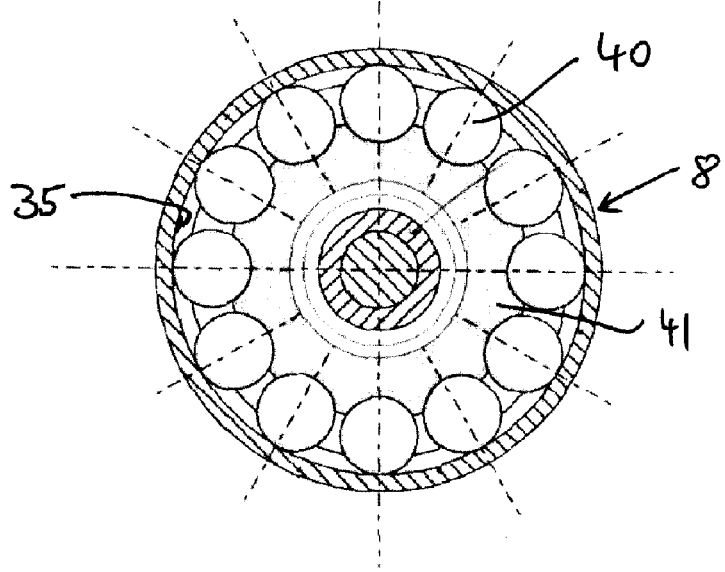

OVERLOAD PROTECTION DEVICE AND MACHINE TOOL HAVING SUCH OVERLOAD PROTECTION DEVICE

BACKGROUND OF THE INVENTION

1. Field of the Invention

The invention relates to a portable device comprising an overload protection device for motor-operated tools. The portable device comprises a drive shaft (input shaft) connected to a drive motor and rotatably driven by it, a driven shaft (output shaft) for driving a cutting tool and arranged essentially perpendicularly to the drive shaft, as well as a drum supported on the output shaft and driven in rotation by a drive pinion. The invention further relates to an overload protection device for an electrically driven machine tool, such as an angle grinder or the like. The overload protection device is arranged within a drive train between a tool and an electric motor driving the tool, wherein the machine tool has a gearbox. The invention also relates to an electrically driven machine tool such as an angle grinder having such an overload protection device.

2. Description of the Related Art

In the prior art it is known to arrange a coupling between a drive shaft and an output shaft in order to enable transmission or interruption of transmission of a rotational movement from a motor to a tool. With such devices it is possible to control the rotational movement of the tool while maintaining a constant rotary speed of the motor. The coupling/decoupling is realized in a conventional way by deflection of a driving means that upon actuation, as needed, connects the input shaft to the output shaft so that the input shaft transmits its movement onto the output shaft.

Systems with positive couplings of this kind are known wherein a positive-engaging element forms the driving means that can be moved between a positive-engaging position, in which the two shafts are connected to one another, and a release position, in which the two shafts are separated from one another.

Moreover, couplings of this kind are known that are arranged within a system operating by friction. In this case, the first shaft has a first surface. The second shaft has a second surface that is positioned opposite the first surface. In this case, the driving means is constituted by the second surface that can be moved between a release position and a position in which it contacts the first surface. This contact ensures by means of friction a coupling action of the two surfaces which results in a connection of the two shafts and transmission of the movement. Such coupling systems have in common that an actuation, for example, by an operator, is required for coupling or decoupling. In the case of a strong overload of the output shaft as is the case when the tool is blocked, the operator cannot act fast enough in order to actuate such a coupling.

U.S. Pat. No. 4,669,590 discloses a coupling system that has a drum connected to the drive shaft. The driving means are formed by clamping jaws connected to the output shaft. The operator must actuate the device in order to effect that the clamping jaws are displaced for contacting the drum so that the drive elements and output element are coupled. In the opposite case, the operator must actuate the device in order to move the clamping jaws in the opposite direction so that the two shafts are separated.

Centrifugal couplings are also known in which the driving means is formed by an inertia body connected to the drive shaft which by the effect of rotation of this shaft and the centrifugal acceleration comes into contact with the output shaft. The coupling connection is thus automatically generated as soon as the rotary speed (rpm—revolutions per minute) of the drive shaft surpasses a certain limit. Such a system, however, does not operate automatically for decoupling, and blockage of the tool does not cause the two shafts to be decoupled.

It has been attempted to integrate torque limiters. For example, devices are known where the transmission of the movement upon surpassing a certain torque can be interrupted. The principle of such a device resides in that the torque limiter is automatically decoupled as soon as a torque limit has been reached. Such devices, for example, are realized by a frictional connection wherein, when a certain limit of the torque between the parts is surpassed, the torque transmission between the two parts is interrupted but the two parts still rub against one another. Such a device has the disadvantage that the entire additional energy is essentially dissipated in the form of heat and that an excessive wear of the friction parts results because they continue to operate as long as the device is under load, i.e., as long as the motor rotates and the torque limit is surpassed.

Another known device is designed such that the output shaft is driven by the drive shaft by means of mutual contact of two slanted surfaces. The slanted surfaces are configured to be complementary to one another and remain pressed against one another by means of a pressing (expanding) device that is adjusted to a certain limit. When surpassing a certain torque to be transmitted, the limit of the pressing device is surpassed. The two slanted surfaces are no longer in contact with one another but glide past one another. The transmission of the movement is no longer ensured. Such a device has the disadvantage that the energy is lost in the form of noise and/or heat. The device remains active as long as the torque is maintained; this causes a significant wear.

A further disadvantage that is common to the aforementioned torque limiters because of their properties resides in that decoupling is only temporary. As soon as the torque between the two shafts is reduced and drops below the value of the predetermined decoupling torque, the device engages again. The output shaft is again driven by the drive shaft. Moreover, the limiters are not very effective in the case of blockage. The devices usually are not very loadable and wear quickly.

U.S. Pat. No. 5,653,509 discloses a device in which radial inertia elements that are connected to the output shaft form the driving means. However, the movement of the inertia elements exclusively in a radial direction can lead to a blockage within their housing during the engagement phase as well as during the automatic decoupling phase that occurs upon blockage of the tool.

No portable device of the prior art has addressed the problem of decoupling of the output shaft when the two shafts are angularly positioned relative to one another, as it is the case, for example, in angle grinding machines (angle grinders). In this type of devices, the two shafts are positioned perpendicularly or at a right angle to one another.

SUMMARY OF THE INVENTION

It is an object of the present invention to generated in the case of overload an automatic separation of the drive train between drive motor and tool with improved effectiveness.

In accordance with the present invention, this is achieved in that the portable device comprises a coupling that engages the drum and is arranged between the drum and the output shaft and, in the case of blockage of the output shaft, provides an automatic decoupling in order to prevent overload of the drive motor wherein the coupling is connected to the output shaft.

In accordance with the present invention, this is furthermore achieved in regard to an overload protection device in that the overload protection device comprises on the side driven by the electric motor a drum and, on the output side connected to the tool, comprises at least one fly body for contacting a circumferential wall of the drum, wherein the overload protection device is arranged in the drive train between the electric motor and the gearbox.

In accordance with the present invention, this is achieved in regard to the electrically driven machine tool in that it has an overload protection device according to the present invention.

In the present invention, a single device provides different effects thus combining the advantages of a coupling and a torque limiter without having their disadvantages. In particular, the present invention provides a coupling that automatically couples or engages and, as soon as the tool becomes blocked, disengages quickly and automatically in a circular movement while the motor is running. In the disengaged position, the two shafts are completely separated from one another without being able to engage one another again as long as the tool is seized or blocked.

The subject matter of the present invention concerns a portable device with safety device for motor-operated tools. The portable device comprises a drive shaft (input shaft) that is connected to a drive motor and is driven by it in rotation; it further comprises a driven shaft (output shaft) that drives a cutting tool and is arranged essentially perpendicularly to the input shaft; it also comprises a drum that is supported on the output shaft and is driven in rotation by a drive pinion. The portable device furthermore comprises also a coupling that engages the drum and is arranged between the drum and the output shaft, wherein the coupling is connected to the output shaft. In the case of blockage of the output shaft, the coupling effects automatic disengagement in order to prevent overload of the drive motor.

According to a preferred embodiment, the transmission of the drive torque is realized by frictional contact between the coupling and the drum.

In an expedient embodiment, the contact surfaces between the coupling and the drum are coated with a friction material.

In a preferred further embodiment, the coupling is forced by a pressing (expanding) device and/or centrifugal force against the drum.

According to another preferred embodiment, the pressing device is comprised of a coil spring or a leaf spring.

In an expedient variant, the pressing device is comprised of an elastomer that is mounted between the output shaft and the coupling.

In another advantageous embodiment, the coupling is combined with driving means wherein first driving means comprise a rotary surface that interacts by friction with a rotary surface of the drum, wherein the aforesaid first rotary surface is pressed by a spring device against the afore mentioned second rotary surface of the drum. Second driving means having a non-radial normal line relative to their surface (surface normal) interact by positive engagement of symmetric or asymmetric profiles with the surface of the drum that has a non-radial normal line relative to its surface (surface normal). The second driving means is returned to the output shaft by means of a return device. The two different driving means are distributed alternating and uniformly about the periphery of the output shaft.

According to an advantageous configuration, the surfaces have two complementary profiles with non-radial surface normals so that a positive engagement of the profiles of these two surfaces enables the transmission of the drive torque.

According to another advantageous configuration, the driving means are formed by an elastomer and a set of balls.

Another embodiment provides driving means that have a rotary surface interacting by friction with a rotary surface of the drum, wherein the driving means comprise a spring device forcing the rotary surface of the driving means against the rotary surface of the drum.

Another embodiment provides that the coupling comprises driving means that have a non-radial surface normal and a symmetric or asymmetric profile interacting by positive-locking engagement a surface of the drum, wherein the surface of the drum has a non-radial surface normal, wherein the driving means comprise a return device for returning the driving means toward the drive shaft.

The invention can be employed in particular in the case of portable devices or portable machine tools wherein the drive of the tool is interrupted when the tool encounters resistance, for example, upon blockage of the tool in a workpiece to be machined.

An advantage of the device according to the invention resides in that in the case of a blockage the tool automatically performs decoupling.

A further advantage of the device according to the invention resides in that, upon blockage of the tool, a counter reaction or kick on the motor shaft and on the operator is prevented.

Another advantage resides in that the device after blockage of the tool continuous to run without this causing wear or overheating.

A further advantage resides in a self-clamping action of the driving means. This provides two advantages. On the one hand, the centrifugal force of the coupling is increased and, on the other hand, the device, when turning of the motor, remains coupled which leads to a more effective braking of the tool.

A further advantage that results from the movement of the driving means (coupling means) on a circular path resides in that the tolerance for malfunctions in comparison to radially moving driving means is significantly improved.

Another advantage of the device according to the invention resides in that the tool can be started in a stepwise manner.

Another advantage of the device of the invention resides in that because of the presence of the spring devices and return devices the limits for the engagement or disengagement can be adjusted by modifying the stiffness of these devices or by adjusting these devices in other ways.

In an advantageous embodiment, an overload protection for an electrically driven machine tool such as an angle grinder or the like as well as a corresponding machine tool provided with such an overload protection device are provided, wherein the overload protection device is arranged in a drive train between a tool and an electric motor driving the tool. The machine tool is provided with a gearbox. The overload protection device has on the side driven by the electric motor a drum and on the output side connected to the tool at least one fly body (flyweight) for contacting the circumferential wall of the drum. The overload protection device is arranged on the drive train between the electric motor and the gearbox. The gearbox is, in particular, embodied as a reducing gearbox that on the side of the tool has a lower rpm than on the side of the motor. The arrangement of the overload protection device on the side of the motor has the effect that the overload protection device can be operated at a very high working rpm. This takes advantage of the square law between centrifugal force and rotary speed (rpm). A very high centrifugal force acts in operation on the flyweight. Since for a given drive output the torque to be transmitted is reverse proportional to the rpm, on the overload protection device at the side of the motor of the reducing gearbox a correspondingly reduced drive torque will act. As a result of this, the overload protection device with the flyweight can be designed to be very small and lightweight overall. Only a minimal or no additional mounting space is required. In combination with a blocking device for the tool spindle of the tool machine, the arrangement according to the invention of the overload protection device contributes to operational safety. For example, for a tool change the tool spindle can be blocked. A simultaneous accidental starting of the electric motor leads only to the drum at the side of the motor being rotated. The support member with the flyweight that is locked at the output side by the blocking device effects at most a minimal frictional connection with the drum because the support member does not itself rotate. An accidentally started drive train at the side of the motor is protected from damage, overheating and the like, by the inventive arrangement.

In an advantageous further embodiment, means for a static pressing action of the fly body against the circumferential wall of the drum are provided. A static pressing action in this context means that the fly body, even without dynamic effects such as rpm-induced centrifugal force, is in frictional interaction with the circumferential wall of the drum. A safe and automatic start-up of the tool from standstill is ensured.

In an advantageous configuration the means for statically pressing the fly body are formed by such a spatial configuration of the overload protection device that a rotary axis of the overload protection device relative to the usual working position of the machine tool is positioned substantially horizontally. In particular, in an arrangement with two or several fly bodies, the horizontal position of the axis of rotation leads to the situation that, independent of the angular position, at least one flyweight is arranged spatially such that under the effect of gravity it automatically moves into a deflected position. In the deflected position, as a result of gravity acting as a pressing force, it is in frictional contact with the circumferential wall of the drum. By simple means, an initial frictional engagement within the overload protection device is ensured that upon starting of the electric motor ensures entrainment of the tool shaft out of its standstill position.

Advantageously, in addition or as an alternative, a radial inner stop can be provided for the fly body wherein a radial outer friction coating of the fly body is forced against the circumferential wall by means of the stop. In this connection, elastic material properties of the friction coating will be taken advantage of. The friction coating with regard to elasticity and shape is configured such that in the rest position it rests with slight clamping action on the drum. The slight clamping action has the effect, on the one hand, of a safe starting behavior and enables, on the other hand, in a blocking situation of the tool a jerk-free slipping.

In an advantageous configuration, a support member is provided with a bearing leg wherein the fly body has two securing legs that engage like a fork the bearing leg. A hinge pin extends through the bearing leg and the securing legs. In this way, a symmetric two-sided pivot support of the fly body is provided that is essentially free of canting effects. The lateral glide surfaces between the bearing leg and the securing legs provide an additional guiding action. The desired alignment of the flyweight remains intact even under high operating loads. For a given size of the device a higher torque can be transmitted while wear is reduced.

In the case of a pivoting support, the fly body has expediently positive-engaging guide means at its free pivoting end. In addition to the guiding action on the hinge bearing, a position fixation of the fly body with guiding action is also provided on the opposite free end. The positional precision of the fly body relative to the drum is further improved.

In an advantageous configuration, the fly body is pivotably supported in a hinge bearing wherein its free end, beginning at the hinge bearing, points in an operational rotary direction of the drum. This provides a so-called trailing arrangement of the fly body. The rotation of the drum in its operational rotary direction does not lead to a self locking action by means of frictional contact with the fly body. Instead, the frictional force on the fly body has a force component relative to the pivot bearing that is directed inwardly in the pivot direction. During usual operation, this inwardly oriented force component is compensated by the outwardly oriented centrifugal force component such that the centrifugal force prevails. For conventional operating loads in the medium and upper rpm range, a sufficient slip-free frictional connection results. As soon as the rpm suddenly or gradually drops below a constructively preset value as a result of unexpectedly increased cutting resistance, the trailing arrangement of the fly body leads to an interruption of the frictional engagement. Because of the resulting slip between drum and fly body, the force flow within the overload protection device will be interrupted instantly. The response time of the overload protection device to blocking of the tool is extremely minimal. In connection with the arrangements of the overload protection device on the fast-rotating drive side of the reducing gearbox, this reaction time and the correlated rotary response angle of the cutting tool are further reduced.

In an expedient further configuration, the section of the drive train between the overload protection device and the gearbox is embodied by a short shaft stub that is supported as a whole by a rolling bearing. The rolling bearing is secured between the support member provided with the fly body and an input pinion of the gearbox. While maintaining the coupling arrangement on the side of the motor of the gearbox, the short configuration of the shaft stub has the effect that the weight of the freely rotating bodies that are to be braked in the blocking situation is minimized. The support of the shaft stub by means of a single rolling bearing facilitates the compensation of positional tolerances between the drive side and the output side of the overload protection device without requiring additional centering means within the overload protection device.

At the same time, the overload protection device can be used as a guide means for the shaft stub. In addition to the supporting action provided by the rolling bearing, the shaft stub is supported also at the location of the overload protection device. This provides a stiff, highly loadable support of the drive pinion with exact position adjustment relative to a connected output gear, for example, in the form of a ring gear or crown gear. The shaft stub and the motor shaft are decoupled with regard to bending; this contributes to the prevention of imbalance.

BRIEF DESCRIPTION OF THE DRAWING

FIG. 9b is a section view along the section line IXb-IXb of FIG. 9a.

FIG. 10b is a section view along the section line Xb-Xb of FIG. 10a.

FIG. 11a is a longitudinal section of an embodiment variant of the portable machine tool in which balls are pressed radially against the drum wall by means of an elastomer.

FIG. 11b is a section view along the section line XIb-XIb of FIG. 11a.

DESCRIPTION OF THE PREFERRED EMBODIMENTS

Figure 1:
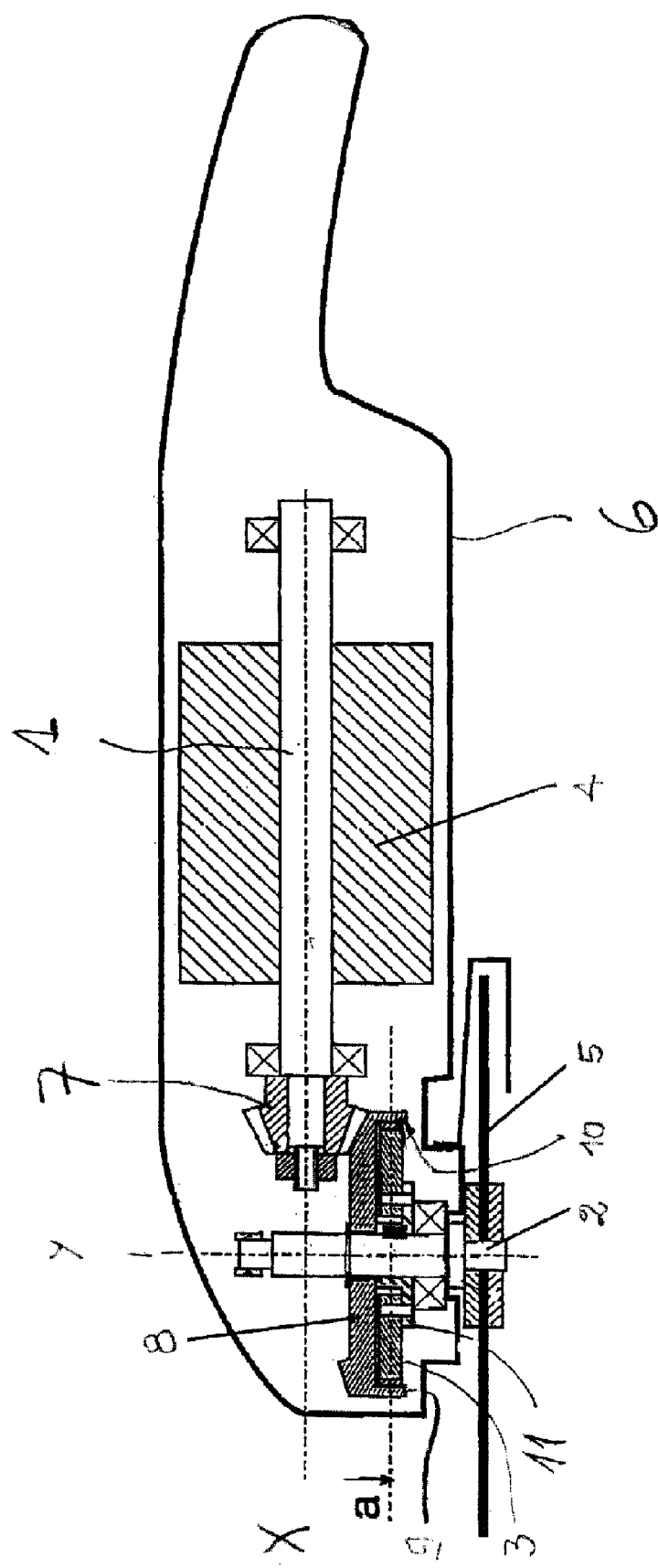
FIG. 1 shows a longitudinal section of a portable machine tool in the form of an angle grinder that is provided with a coupling according to the invention, wherein the coupling is illustrated in section.

In the various embodiments, like parts are referenced with like reference numerals.

FIG. 1 shows a portable device, for example, in the form of an angle grinder. A special feature of this device resides in that the drive shaft 1 and the output shaft 2 are not aligned with one another but are positioned angularly relative to one another, in particular, perpendicularly or at a right angle. The drive shaft 1 is connected to the motor 4. This connection can be realized by any known means directly (external spline shaft connections, spline shaft connections or the like) or by means of a transmission element. This connection is permanent. The motor can be of any type, in particular, an electric motor, a hydraulic motor, a pneumatic motor, an internal combustion engine or the like.

The tool 5, in the illustrated case a cutting-off wheel, is connected to the output shaft 2 and is driven in rotation by the output shaft by means of driving means of a coupling 3. In one configuration, the housing 6 of the device extends parallel to the tool 5. The drive shaft 1 comprises an angular gear 7 that is in engagement with the drum 8 having a circumferential wall 9. The drum 8 forms a bevel gear which engages the bevel pinion 7 of the drive shaft 1.

The wall 9 delimits a surface 10 that is arranged centrally on the output shaft 2. This surface 10 is preferably cylindrically embodied in its interior in order to provide greatest possible resistance to a movement that is directed radially away from the axis Y of the output shaft 2. Alternatively, this surface 10, for example, can also be conical or can have any other shape wherein the surface 10 is directed toward the shaft 2. The surface 10 can be rotating or non-rotating. The topology of the surface 10 is as desired, provided that its surface normal (line extending perpendicularly to the surface) is oriented toward the shaft 2.

The coupling 3 comprises one or several driving means 3a to 3d which relative to FIG. 2 will be described in more detail. The number of these driving means 3a-3d integrated into the drum 8 is freely selectable. By arranging several driving means 3 therein, the function of the device can be improved in that the effect of the driving means is distributed about the circumference. A number of driving means that is at least two, enables an improved balance behavior by preventing imbalance. The Figures show exemplary embodiments with four driving means, respectively. The driving means are connected to the output shaft 2 by means of a hub 11 in order to be driven by it in rotation. The driving means are movable so that, under the effect of centrifugal acceleration, they can widen or spread. According to the invention, the interior delimited by the drum 8 is advantageously used for housing the coupling 3. The coupling 3 interacts with the drum 8 in order to effect the drive and release of the tool 5 by means of its output shaft 2.

Figure 2:
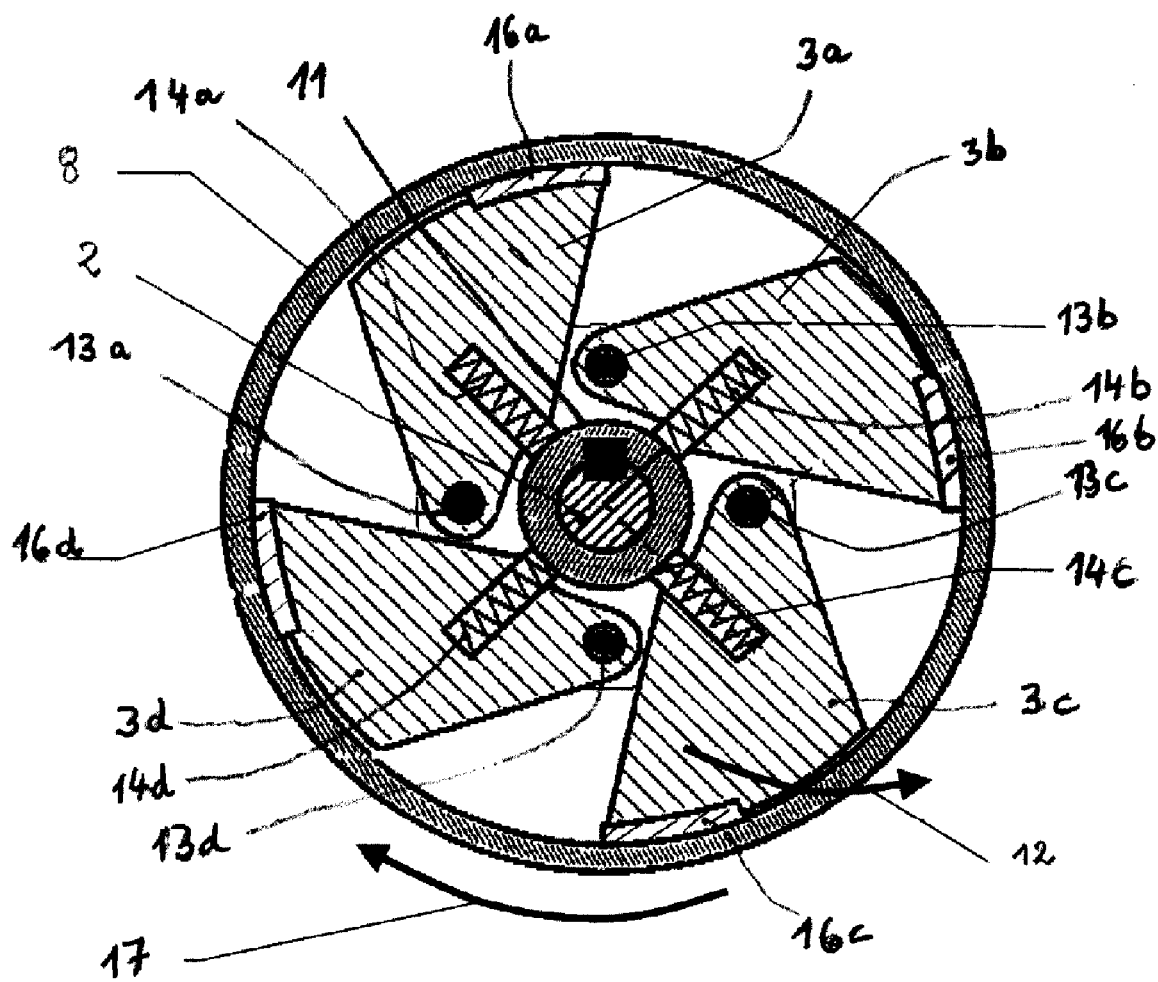
FIG. 2 is as section plan view of the device according to the invention showing a first embodiment with cylindrical friction surfaces.

FIG. 2 shows in a section view of FIG. 1 a plan view onto the coupling mounted in the device that is the subject matter of the present invention. The driving means 3a to 3d—four in the illustrated case—are connected to the output shaft 2 such that their widening or expansion is realized on a circular movement path that is illustrated by the arrow 12. Only the drum 8 of the drive device is visible in this illustration. In this embodiment, the driving means 3a-3d are arranged to pivot about axles 13a to 13d that extend parallel to the output shaft 2 and are connected to the output shaft 2, as described above, by means of a key via the hub 11.

For generating a minimal friction that is required for the initial drive for rotating the output shaft 2, the driving means 3a-3d are preferably forced against the drum 8 by a spring device 14a to 14d, respectively. The configuration and adjustment of the spring device that can be realized in any way known to a person skilled in the art enables an adjustment of a residual or frictional starting torque C1.

Each spring device 14a-14d is arranged such that it can exert a pressure with a lever arm relative to the point of rotation of each driving means 3a-3d, in this case relative to the axle 13. By this pressure, the driving means 3a-3d are moved in the direction of widening (expansion) in the pivot direction 12.

Each driving means 3a-3d is provided with a frictional coating 16a to 16d on the contact surface facing the drum 8.

In the rest position, the two shafts 1, 2 are standing still. In operation, the portable device is operated by rotation of the input shaft (drive shaft) 1 by means of the motor 4. The input shaft 1 initially rotates alone while the output shaft 2 is standing still. Between the two shafts 1 and 2 there is residual friction present which is essentially dry and therefore independent of the relative speed of the two shafts 1, 2. This friction between the opposed surfaces of the driving means 3a-3d and the drum 8 enables the transmission of a weak torque. In a first starting phase of the portable device, the tool 5 does not engage the workpiece to be machined. The torque caused by the reaction of the tool 5 to the motor 4 remains negligible. The torque as a result of the friction, even though weak, is sufficient in order to start the rotation of the output shaft 2. It should be noted in this context that this start can be realized only when the tool 5 is free of any load. Moreover, this start is carried out necessarily in a stepwise fashion. The rotary speed of the output shaft 2 and thus that of the driving means 3a-3d connected thereto on a circular path increases until the centrifugal acceleration is sufficient in order to effect widening or expansion of these driving means 3. This widening or expansion is realized on the circular path 12 and causes the driving means 3a-3d to contact with their surface facing the drum 8 the inner side of the circumferential wall 9. This contact enables the transmission of a drive torque that is greater than the starting torque caused by residual friction. After static friction has been established, the contact is maintained automatically and is increased with further increase of the rotary speed of the output shaft 2. As a result of this, the torque to be transmitted will increase until the maximum output of the device is reached. The tool 5 can be used for machining workpieces to be machine. With a constructive adaptation of the driving means 3a-3d, a decoupling action of the coupling 3 from the tool can be set, for example, to a value of 2000 rpm.

When, as is frequently the case with such devices, blockage of the tool 5 is caused by jamming of the tool 5 in the workpiece to be machined or as a result of any other exceptional resistance, the tool 5 is abruptly stopped. This case occurs, for example, when a cutting-off wheel will jam within a cut that will close again because of deformation of the workpiece. This case can also occur in the case of a motor chainsaw that will jam because of a deformation of the cut produced by the saw or because of the presence of an object in the workpiece. Such an object will create a resistance or cannot be cut, for example, a nail that is present within the wood, and interrupts the rotation of the chain by blocking a tooth. In such a device according to the prior art, where the motor 4 is coupled to the tool 5, such an abrupt stop of the tool 5 causes a sudden rearwardly oriented torque (kick) that acts on the motor 4 and the housing of the device as well as on the operator.

According to the present invention, the tool 5 is stopped when a blockage occurs. The centrifugal acceleration that has effected the widening of the driving means 3a-3d will be canceled very quickly so that the contact that has been present up to this point and that enabled the transmission of the driving torque onto the output shaft 2 is interrupted. The drive shaft 1 and the output shaft 2 are no longer connected with one another. Therefore, no recoil or kick can occur. The motor 4 can continue to rotate because it transmits only a very weak torque onto the output shaft 2. This situation can be permanent without this causing excessive wear or overheating of the motor. The device can not automatically couple again as long as the tool 5 is blocked. As in the start-up situation, only the residual friction is present that is practically ineffective or at least negligible in comparison to the torque of the jamming action of the tool 5 that has caused its blockage. The advantage of the present intention resides in this feature that provides the operator with very high safety.

Of course, after termination of the blockage of the tool 5, the coupling re-engages again in a stepwise fashion without there being the risk of an abrupt initiation of transmission.

The driving means 3a-3d comprise flyweights that widen because of the action of the centrifugal acceleration. The flyweights widen according to a significant feature of the invention on a circular path 12. Driving means are known in the prior art that move linearly in a radial direction. Such a radial movement perpendicular to the axis of rotation entails a significant risk of blockage of the driving means in their housing. For such a radial arrangement, neither the pressing force of the flyweights on the drum nor the size of the opposed surfaces of the equivalent elements, i.e., the drum and the driving means, can be changed.

Figure 3:
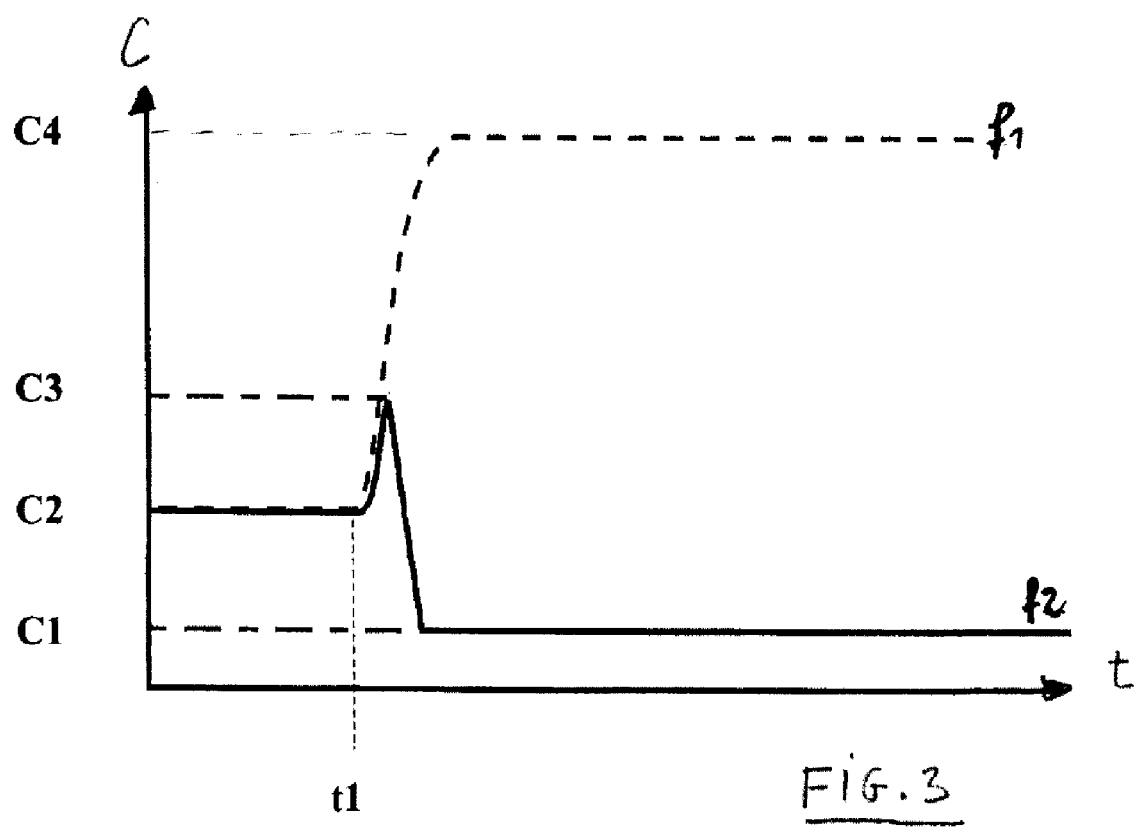
FIG. 3 shows comparative curves of the torque as a function of time.

The curve of FIG. 3 illustrates the functional principle of the overload protection device according to the invention. In this graphic illustration, the torque C is illustrated on the ordinate as a function of time 7 on the abscissa. A first curve f1, in dashed lines, illustrates the behavior of a device without overload protection device. In such a device, the curve of the torque reaches a first level corresponding to a normal working phase in which the device has a torque C2. At the point in time t1 that corresponds to a blockage of the tool, the torque increases very quickly. This torque is not limited and can therefore increase until a second level is reached that corresponds to the maximum torque C4 that can be very high and can destroy the motor 4.

A second curve f2, illustrated in solid lines, illustrates the behavior of a device with a coupling according to the invention. The curve reaches a first level that corresponds to the normal working phase in which the device develops a torque C2. At the point in time t1, where a blockage of the tool takes place, the torque increases very quickly. The blockage of the tool is responded to very quickly by the coupling according to the invention. The interruption of the centrifugal acceleration has the effect of a return of the driving means 3a-3d toward the output shaft 2, and the drive shaft 1 is separated/decoupled from the output shaft 2. Initially, the torque increases until it reaches a higher limit C3 that depends on the response time of the coupling. This limit C3 is however significantly lower than the limit C4 that would be reached without overload protection device. The torque drops very quickly to the level of the torque C1. This low value C1 of the torque corresponds to the residual friction that enables, as pointed out above, the starting action of the device.

The pivot direction 12 of the widening action of the driving means 3a-3d can be oriented as desired. The inertia behavior of the coupling remains identical independent of whether the movement is carried out in the direction or counter to the direction of the circular movement 17 (FIG. 2) of the drive shaft 1.

Preferably, the driving means 3a-3d are configured such that the circular movement 12 is counter to the nominal rotational movement 17 of the drive of the drive shaft 1. In the embodiment illustrated in FIG. 2, the flyweights of the driving means 3a-3d are freely pivotable about axles 13 that are connected to the output shaft 2 and are coaxial thereto. The startup of the output shaft 2 in the rotational direction 17 initiated by the drive shaft 1 generates a centrifugal acceleration that causes a circular movement 12 of each flyweight about the axle 13 counter to the rotational direction 17. Such an arrangement has the advantage that upon contact between the opposed surfaces of the wall 9 and of the driving means 3a-3d caused by the spreading effect a self-locking action results that reinforces the connection between the driving means 3a-3d and the drum 8. This self-locking effect is increased even more when the torque between the drive shaft 1 and the output shaft 2 is reversed. For example, when the motor 4 is stopped, a braking action results. This self-locking effect ensures advantageously a coupling action of the two shafts 1 and 2 and ensures a fast stopping action of the tool 5.

There is no risk in regard to the tool 5 that the tool will continue to rotate in a freewheeling action. Moreover, it is an advantage that the strength of this self locking effect and particularly the centrifugal pressing force can be adjusted in that the lever arm, i.e., the angular displacement between the center of rotation of the driving means 3a-3d, in this case the axle 13, and the center of gravity of the driving means 3a-3d can be changed. The strength of the self-locking effect is proportional to this angular displacement.

According to the above described embodiment of the invention, the driving means 3a-3d are pivotably supported. This facilitates a relative rotation of one surface to the other in the overload situation. The possibility of transmission of torque upon contact between these two surfaces is thus provided by friction of the two surfaces on one another.

In order to improve the quality of this frictional action, the surface properties of one or both surfaces can be changed. This can be realized by machining the surfaces. In view of the desired high value of the coefficient of friction, it is advantageous to cover the first surface, the second surface or both surfaces with friction material 16. This material is preferably a coating that, for example, is used for manufacturing brake pads. The coating can be attached by any known means, for example, by gluing it to each driving means.

Figure 4:
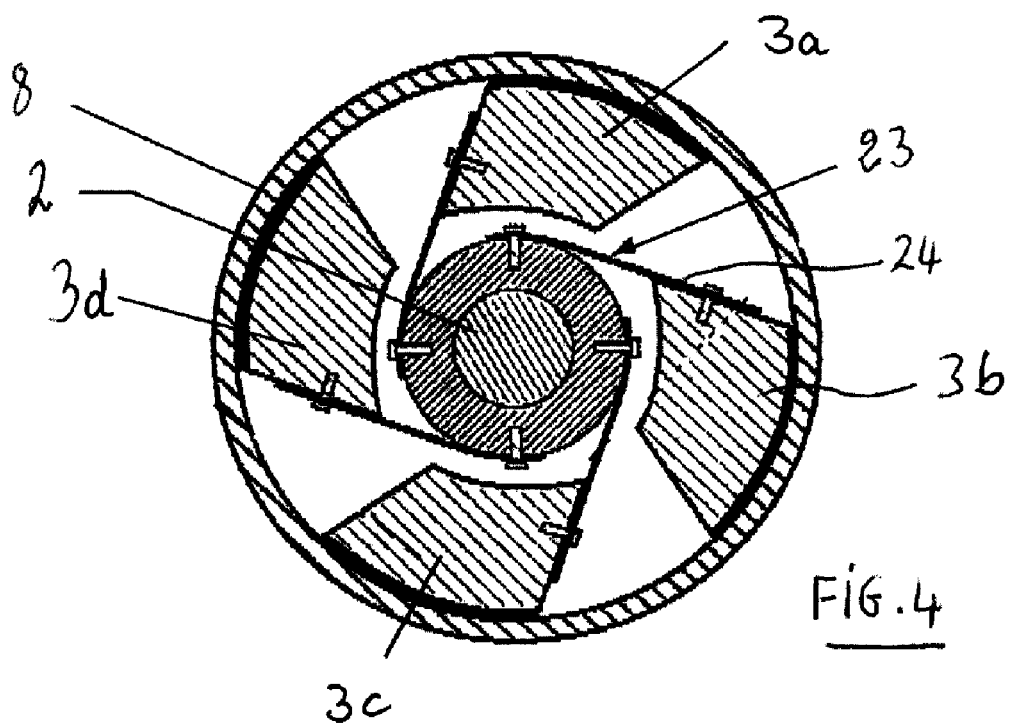
FIG. 4 is section plan view of the device according to the invention according to FIG. 2 with a modified attachment of the driving means realized by leaf springs.
Figure 5:
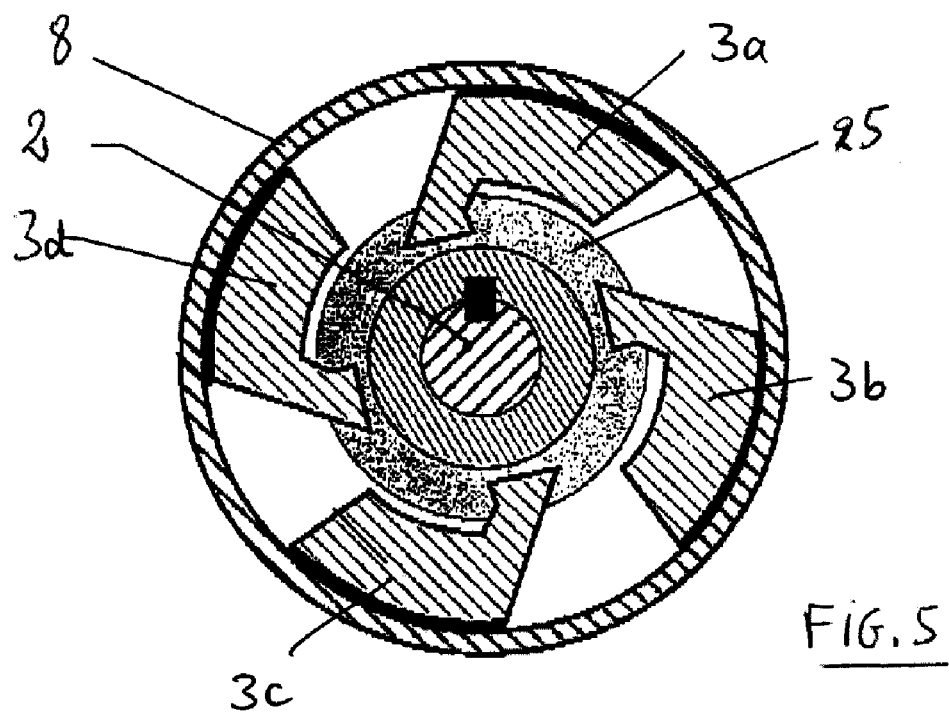
FIG. 5 is a section plan view of the device according to FIG. 2 with a modified attachment of the driving means realized by an elastomer.

Another embodiment that enables the circular widening action resides in that an elastic device 23 is used, as illustrated in FIGS. 4 and 5. It should be noted that this elastic device 23 enables a circular widening of the driving means, on the one hand, and fulfills also the function of a spring device and optionally the function of a return device by means of an initial prestress.

FIG. 4 shows a first embodiment of such an elastic device 23. In this embodiment, the driving means 3a-3d is attached by a leaf spring 24 on the output shaft 2. The leaf spring 24 is outwardly prestressed in order to fulfill the function of the spring device. It can also be prestressed in the other direction when it is supposed to fulfill the function of a return device.

The second embodiment of such an elastic device 23, as illustrated in FIG. 5, resides in the use of an elastomer member 25. The elastomer member 25 arranged between the output shaft 2 and driving means 3a-3d serves, on the one hand, for their attachment to one another, wherein the widening movement 12 of the driving means 3a-3d is enabled because of the elasticity of the elastomer member 25. On the other hand, it fulfills the function of a spring device in order to force the driving means 3a-3d against the drum 8. Optionally, it can also take on the function of a return device that returns the driving means 3a-3d toward the shaft 2.

Figure 6:
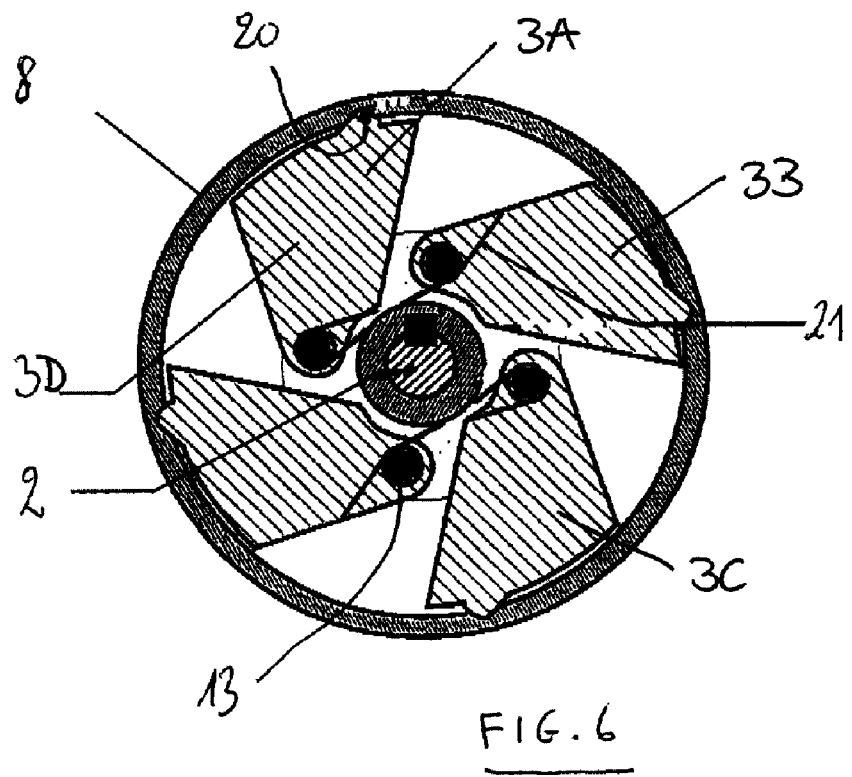
FIG. 6 is a section plan view of the device according to the invention showing a second embodiment with positive-engaging, asymmetric engagement profiles.

In FIG. 6, a further embodiment of the invention is illustrated. The opposed surfaces of the drum 8 and of the means 3A-3D have in a plane that extends transversely to the shaft 2 complementary profiles 20 that mesh with one another and generate a resistance in regard to the relative movement. This enables the transmission of drive torque between these surfaces and thus between the two shafts 1 and 2. In this embodiment, the parts of the aforementioned surfaces extend in the rotational direction and have radial surface normals (normal=a line perpendicular to the surface). Only friction prevents a relative movement of the respective surface sections relative to one another.

Note that frictionally engaging drive means are referenced with lower case letters (3a-3d), while positively engaging drive means are referenced with capital letters (3A-3D).

In addition or as an alternative, the opposed surfaces of the drum 8 and of the driving means 3A-3D have complementary sections whose surface normals are not radial. These normals are positioned at a slant to the radial direction and do not intersect the axis of the shaft 2. The profiles 20 form a resistance for the relative rotation and enable a transmission of a drive torque. As in the preceding embodiments, the profile in the longitudinal direction parallel to the axis of the shaft 2 is can be of any design. It can be cylindrical but also conical or configured in any other way. The decisive profile is the transverse profile in section view of the axis.

Figure 7:
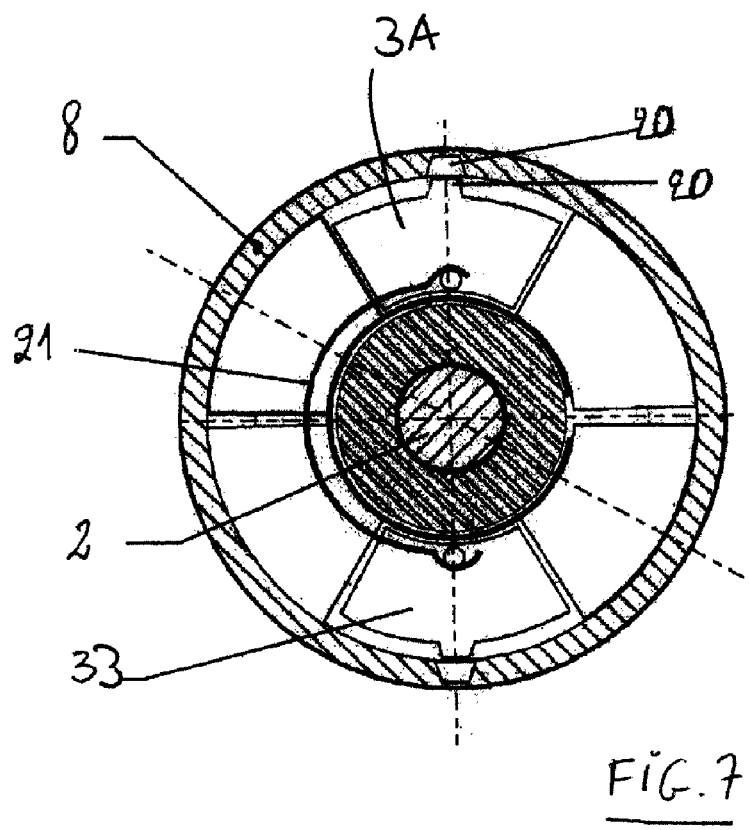
FIG. 7 is a section plan view of the device according to the invention in a variation of the embodiment of FIG. 6 with symmetric engagement profiles.

In this second embodiment, two variants can be differentiated. The profiles 20 in question can be symmetrical relative to a radius, as illustrated in FIG. 7. One feature of this variant resides in that a drive torque can be transmitted equally and in the same way in one or the other rotational direction.

Alternatively, these profiles 20 can be configured asymmetrically to the radius, as illustrated in FIG. 6, in order to enable the transmission of a drive torque in one rotational direction and to prevent it in the other rotational direction. According to an advantageous embodiment, the drive can be realized in a direction that is counter to the rotational direction 17 of the drive shaft 1. Accordingly, this drive is effective according to a self locking action only when the motor 4 stands still. On the other hand, in the case of blockage of the tool 5 no significant torque can be transmitted.

In order to avoid drive surfaces that are too large during the start phase, the driving means 3A-3D are preferably returned by a return device 21 in the form of a spring toward the output shaft 2, as illustrated in FIGS. 6 and 7. This return device 21 and the opposed profiles 20 are configured such that the driving means 3A-3D are retracted completely into the return position. In this way, the opposed surfaces of the drum 8 and of the flyweights 3A-3D cannot engage one another in any way one another as long as the coupling device is decoupled. The effect of this return device 21 is canceled during the course of rotation by the centrifugal acceleration that enables the driving means 3 to move outwardly for the purpose of engagement. Such driving means 3A-3D with positive-locking engagement can be used alone if a residual friction between the external parts of the driving means 3A-3D and the surface of the drum 8 is present that enables starting of the output shaft 2. With this starting action in connection with a centrifugal acceleration, the driving means 3A-3D are widened stepwise until engagement of the profiles 20 of the opposed surfaces is realized so that a positive-locking engagement is provided. As soon as the output shaft 2 is blocked subsequent to blocking of the tool, the driving means 3A-3D is returned toward the output shaft 2 by the common effect of the cancellation of the centrifugal acceleration and the return device 21.

The driving means widen on a circular path toward the circumference. This is enabled by a pivot action about an axle 13 about which each driving means can rotate freely, as illustrated in FIG. 2. The axle 13 extends preferably parallel to the drive shaft 2 in order to facilitate the widening action 12 by the effect of the centrifugal acceleration.

Figure 8A:
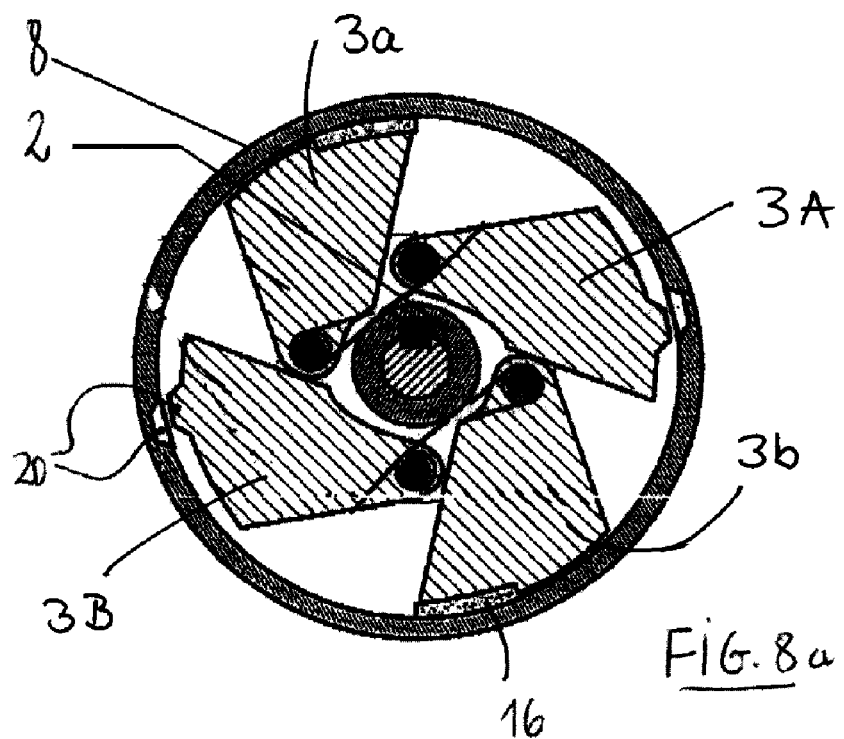
FIG. 8a is a section plan view of the device according to the invention with a modified arrangement relative to FIGS. 1 through 7, wherein the first and the second embodiments are combined with another; the decoupled position is shown.
Figure 8B:
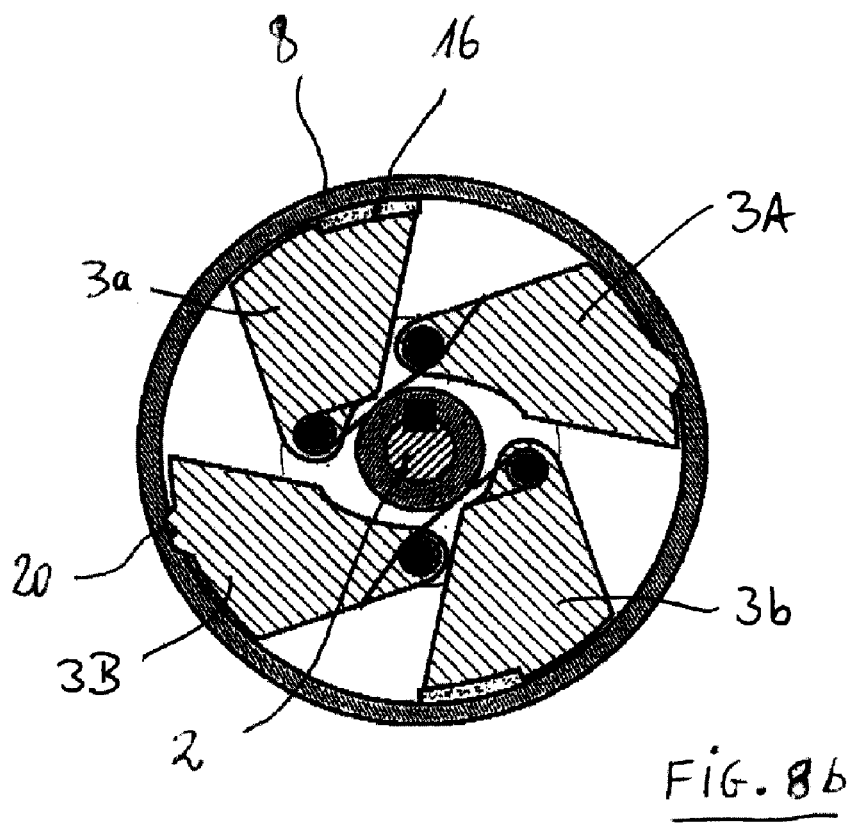
FIG. 8b shows the device of FIG. 8a in the engaged position.

FIGS. 8a and 8b show a combination of two configurations. Above, an embodiment of the invention has been described that comprises driving means 3a-3d that have a rotational surface that interacts with a rotational surface of the drum by friction wherein the aforesaid surface preferably is forced by spring device 14 against the drum 8. Above, another embodiment has been described also which comprises driving means 3A-3D that have a non-radial surface normal that interacts with a matching surface of the drum 8 with non-radial normal by positive engagement of symmetric or asymmetric profiles 20, wherein the driving means 3A-3D are returned by a return device 21 toward the output shaft 2. These two configurations function independently of one another.

However, it can be advantageous to combine them in that alternating one or the other kind of driving means 3a-3d, 3A-3D are used and uniformly distributed above the circumference of the output shaft 2. The advantage of such an alternating arrangement resides in that the driving means 3a-3d acting based on friction and having during starting a very progressive behavior can be combined with driving means 3A-3D with a positive-locking profile 20 that ensures a very good transmission of the torque. It is also possible to employ more effective return devices in order to reduce prevent the risk of a self locking positive engagement. The system combined in this way operates with driving means 3a, 3b (FIG. 8a, 8b) based on friction and ensures the drive during starting. As soon as a centrifugal acceleration is reached that is so great that it can overcome the return device 21, in the second step a positive-locking connection is provided by spreading (expansion) of the driving means 3A, 3B (FIG. 8a, 8b) having a positive-locking configuration. FIG. 8a show such an example of a combination in the decoupled/stopped position. FIG. 8b shows the same combination in the rotating/engaged position.

The present invention concerns machine tools or portable devices of any kind. The aforementioned coupling is arranged directly between the motor 4 and the tool 5 in order to interrupt the drive action of the tool 5 when the tool encounters great resistance that leads, for example, to blockage of the tool in the workpiece to be processed.

Figure 9A:
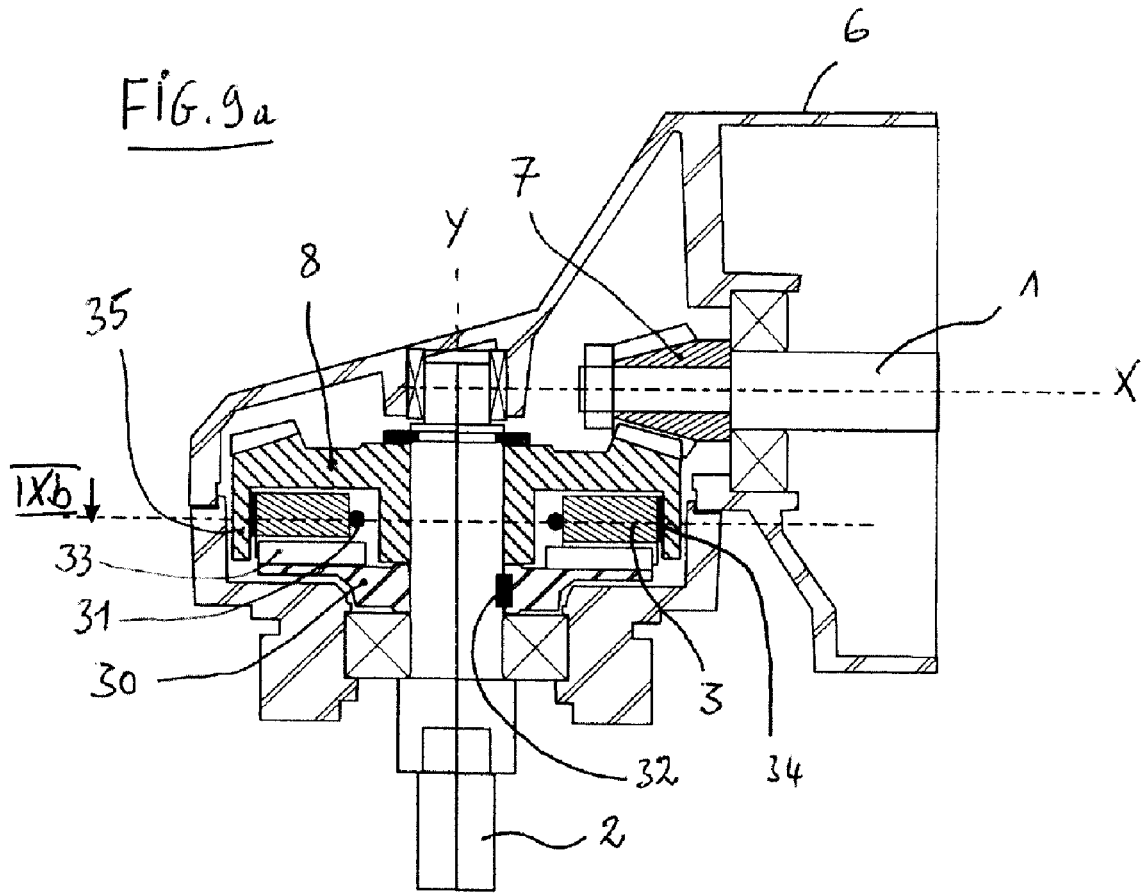
FIG. 9a is a longitudinal section of an embodiment variant of the portable machine tool with coupling elements that can be radially pressed against the drum.
Figure 9B:
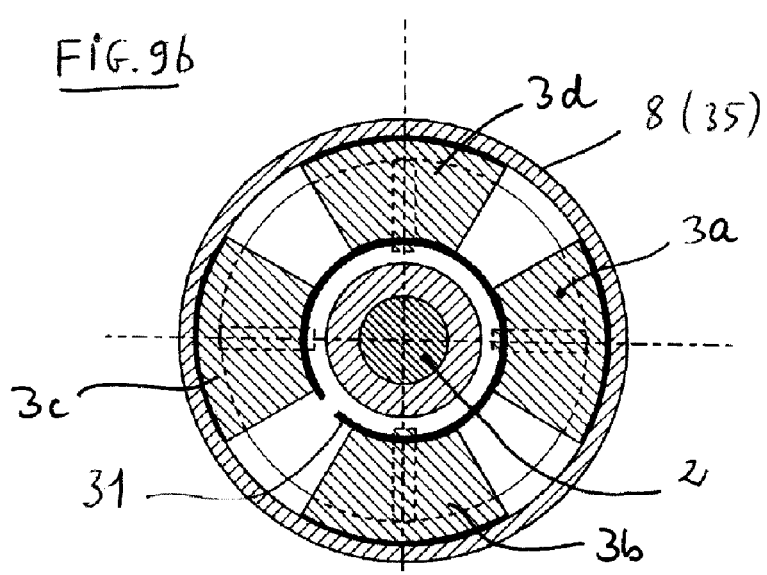

In FIG. 9a, another embodiment of the driving means forming the coupling is illustrated where the output shaft 2 is driven by the drive shaft 1. In this configuration, each flyweight 3a-3d is pressure-loaded by the force of a spring 31 and provided with a friction coating 34. The friction coating 34 is arranged parallel to the output shaft in order to contact the wall 35 of the drum. Each flyweight 3a-3d is mounted on a hub 30 by means of a toothing 33 that can be straight, radial or curved. The hub 30 itself is fastened on the shaft 2 by a fastening key 32 in order to be driven by it. FIG. 9b shows the spatial arrangement of the flyweights 3a-3d relative to the wall 35, the spring 31, and the output shaft 2. Each flyweight 3a-3d therefore contacts as a result of a translatory movement the wall 35 of the drum and effects in this way a driving action of the tool.

Figure 10A:
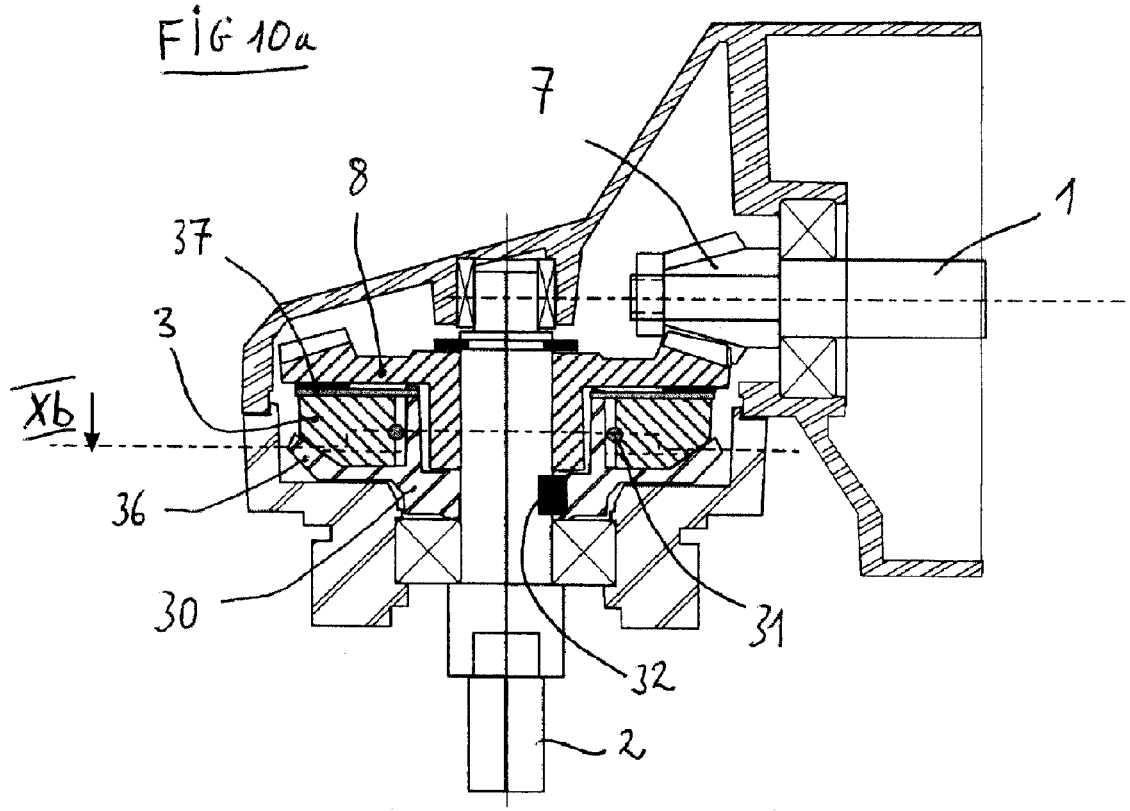
FIG. 10a is a longitudinal section of an embodiment variant of the portable machine tool with coupling elements that can be forced against the drum by means of ramps.
Figure 10B:
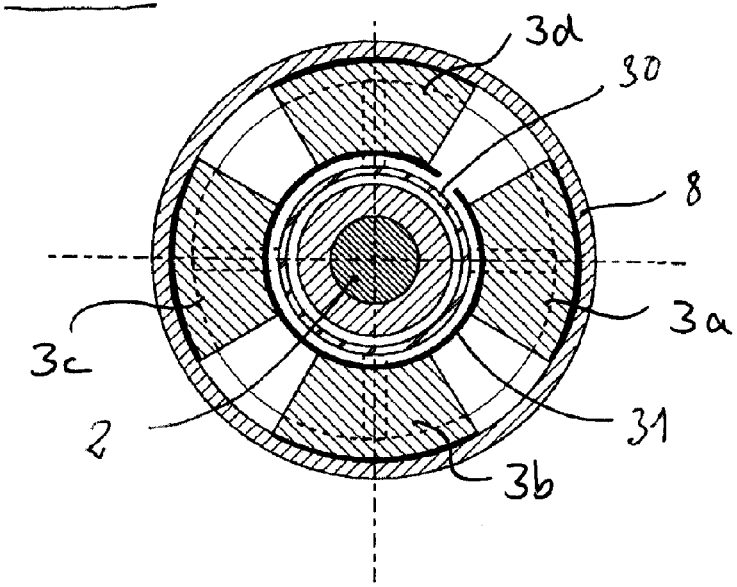

In FIG. 10a, an embodiment variant is shown in which each flyweight 3a-3d has friction coating 37 and is supported by a slanted surface 36 of the hub 30. The friction coating 37 is arranged perpendicularly relative to the output shaft 2. In this arrangement, the drum 8 has no wall. FIG. 10b shows the spatial arrangement of the flyweights 3a-3d relative to the drum and the hub. Each flyweight 3a-3d contacts by translatory movement the drum 8 in order to effect the drive action. In this case, each flyweight 3a-3d glides on the slanted surface 36 of the hub in order to tightly contact in a stepwise fashion the drum 8 in the axial direction. In this embodiment, the friction coating 37 can be a disk. This disk can, of course, be glued to the drum 8 and can be attached with its center part by the hub 30, as illustrated in FIG. 10a. A reverse arrangement can also be selected where the friction coating disk is fastened on the flyweight or the drum.

In FIG. 11a, a different embodiment variant is shown where the drum has a wall 35 and the coupling 3 is arranged between the hub 30 and the wall. This coupling 3 is in the form of an elastomer member 41 and a set of balls 40. The elastomer member fulfills the function of a spring and the balls provide a friction engagement. In FIG. 11b the arrangement of the balls 40 resting against the wall 35 is shown. The action of the centrifugal force causes the elastomer member to expand in order to force the balls against the wall 35 and to effect in this way the drive action of the output shaft 2.

The function of the configuration according to FIGS. 9, 10, and 11 is identical to that disclosed in connection with FIGS. 1 through 8.

Figure 12:
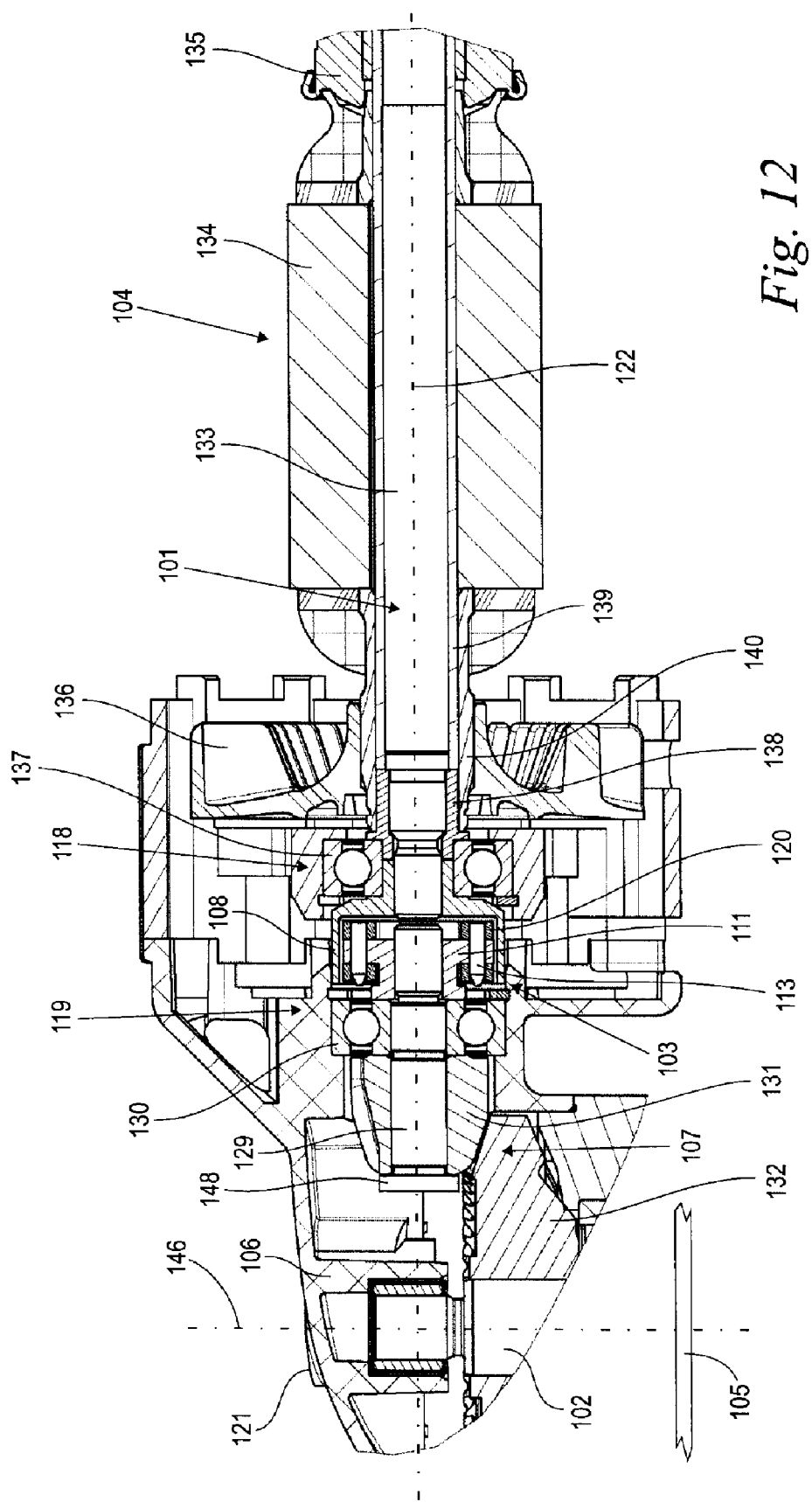
FIG. 12 shows in a longitudinal section a detail of a further embodiment of an angle grinder with an overload protection device arranged within the drive shaft that is horizontally positioned.

FIG. 12 shows a detail of a longitudinal section illustration of an electrically driven machine tool, exemplified by an angle grinder, that is comparable in its basic configuration to the tool machine of FIG. 1. A tool 105 in the form of a cutting-off wheel is mounted on the tool spindle 102. The tool spindle 102 is rotatably supported in a housing 106 of the angle grinder on an axis of rotation 146. A gear in the form of a ring gear 132 is fixedly connected to the tool spindle 102. In the housing 106, a blocking device 121 is indicated that, when being suppressed, positive-lockingly engages the ring gear 132 and, in this way, blocks the tool spindle 102 in the rotational direction, for example, for changing the tool 105.

For driving the tool spindle 102 or the tool 105, an electric motor 104 is provided; only the area of its armature 134 with rearward commutator 135 is illustrated in the drawing in order not to obfuscate the drawing. A hydraulic motor, pneumatic motor or internal combustion motor can also be expedient. Preferably, a drive is selected that can be operated from a standstill, i.e., without idling, so that an intermediately positioned centrifugal clutch is not required. The armature 134 and the commutator 135 are fixedly mounted on the motor shaft 133. Between the armature 134 and the motor shaft 133 an insulating pipe 139 for electrical insulation is arranged. On the end of the motor shaft 133 facing the tool spindle 102 another insulating sleeve 140 is slipped onto the insulating pipe 139; the sleeve 140 supports in turn a fan 136 entrained in rotation. In the area of the end remote from the commutator 135, a spacer sleeve 138 adjoins the insulating pipe 139 that is slipped onto the motor shaft 133 and is partially surrounded by the insulating sleeve 140. A bell-shaped drum 108 is screwed onto the illustrated end face of the motor shaft 133 and clamps the spacer sleeve 138 against a step of the motor shaft 133 as well as against the end face of the insulating pipe 139. At the same time, a rolling bearing 137 is clamped between the drum 108 and the radial collar of the spacer sleeve 138. The aforementioned parts together form a shaft assembly that is rotatably supported by means of the illustrated rolling bearing 137 as well as an additional rolling bearing (not illustrated) in the area of the commutator 135.

Coaxial to the motor shaft 133, a short separately embodied shaft stub 129 is supported in the housing 106 on the end face facing the drum 108 by means of a single rolling bearing 130 in the form of a ball bearing. A support member 111 is screwed onto the end of the shaft stub 129 projecting into the drum 108; the support member 111 clamps the rolling bearing 130 and an opposed adjoining input pinion 131 against a collar 148 at the end of the shaft stub 129.

On the support member 111, fly bodies 120 are pivotably supported by means of hinge pins 113. The fly bodies 120 pivot under the effect of the centrifugal force radially outwardly against the drum 108 so that an overload protection device 103 is provided.

The motor shaft 133, the shaft stub 129, and the overload protection device 103 form together a drive shaft 101 for driving the input pinion 131. In the illustrated embodiment, the input pinion 131 is a bevel pinion that cooperates with the toothing of the ring gear 132. A gearbox 107 is provided that in the illustrated embodiment is configured as a bevel gear box. It can also be expedient to employ a spur gearbox, for example, in the form of a planetary gear system. The input pinion 131 has a smaller diameter with a smaller number of teeth in comparison to the ring gear 132. The gearbox 107 is therefore a reducing gear in which the tool spindle 102 in comparison to the drive shaft 101 has a reduced rotary speed with higher torque. In the illustrated embodiment of the gearbox 107 in the form of an angle or bevel gear, the axis of rotation 146 of the tool spindle 102 is positioned perpendicularly (at a right angle) to the axis of rotation 122 of the drive shaft 101. It is also possible to provide angles that are different.

The angle grinder according to FIG. 12 is illustrated approximately in its usual working position in which the axis of rotation 122 of the drive shaft 101 is approximately horizontal. The overload protection device 103 is positioned within the drive train of the angle grinder between the gearbox 107 and the electric motor 104 driving the tool 105 such that it rotates together with the drive shaft 101 about the same, essentially horizontally positioned axis of rotation 122. The hinge pins 113 are arranged at radial spacing and axis-parallel to the axis of rotation 122 so that axis-parallel, substantially horizontally positioned pivot axes for the fly bodies 120 are formed. The fly bodies 120 are fastened on the output side 119 facing the tool by means of the hinge pins 113 and the support body 111 on the shaft stub 129. The drum 108 is fastened on the side 118 that is driven by the electric motor 104 on the motor shaft 133. During normal operation, the fly bodies 120 rest frictionally against the inner side of the drum 108 and provide a fixed connection for common rotation between the motor shaft 133 and the shaft stub 129. Further details in regard to the function of the overload protection device 103 will be explained in the following in connection with FIGS. 13 to 15.

As a result of the engagement of the support body 111 with the fly bodies 120 and the drum 108, a self-centering action of the shaft stub 129 relative to the motor shaft 133 occurs in this area. In addition to the support by its rolling bearing 130, the shaft 129 is supported also at an axial spacing thereto in the drum 108.

Figure 13:
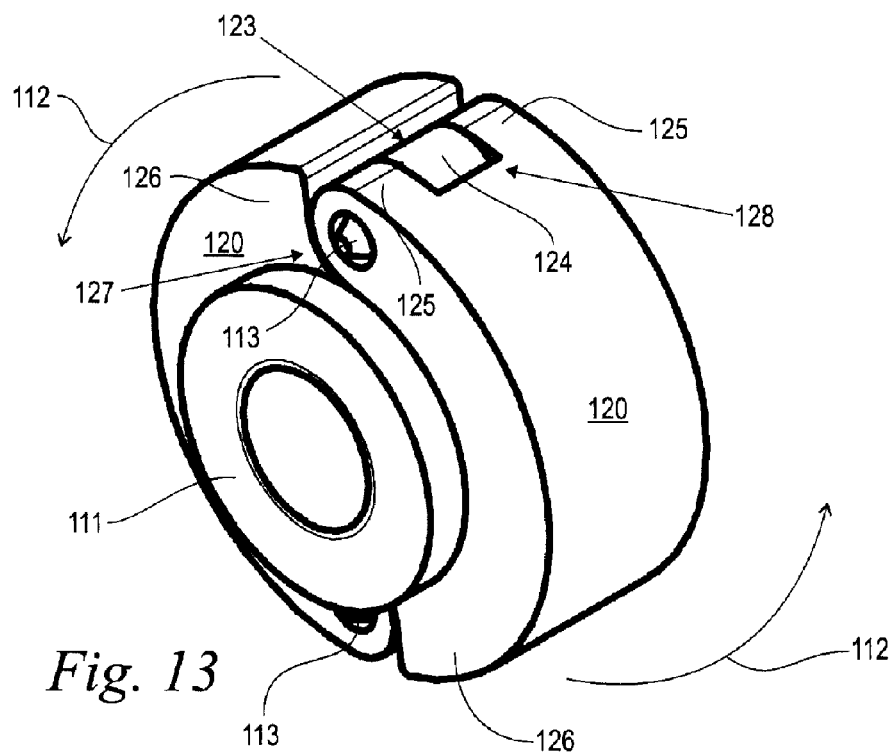
FIG. 13 is a perspective view of the support member at the output side of the overload protection device according to FIG. 12 with two pivotably supported fly bodies.

FIG. 13 shows in a perspective view an enlarged illustration of the assembly of support body 111 with fly bodies 120 secured thereon. Preferably, two fly bodies 120 are provided. A number of fly bodies other than two can be expedient also.

Figure 14:
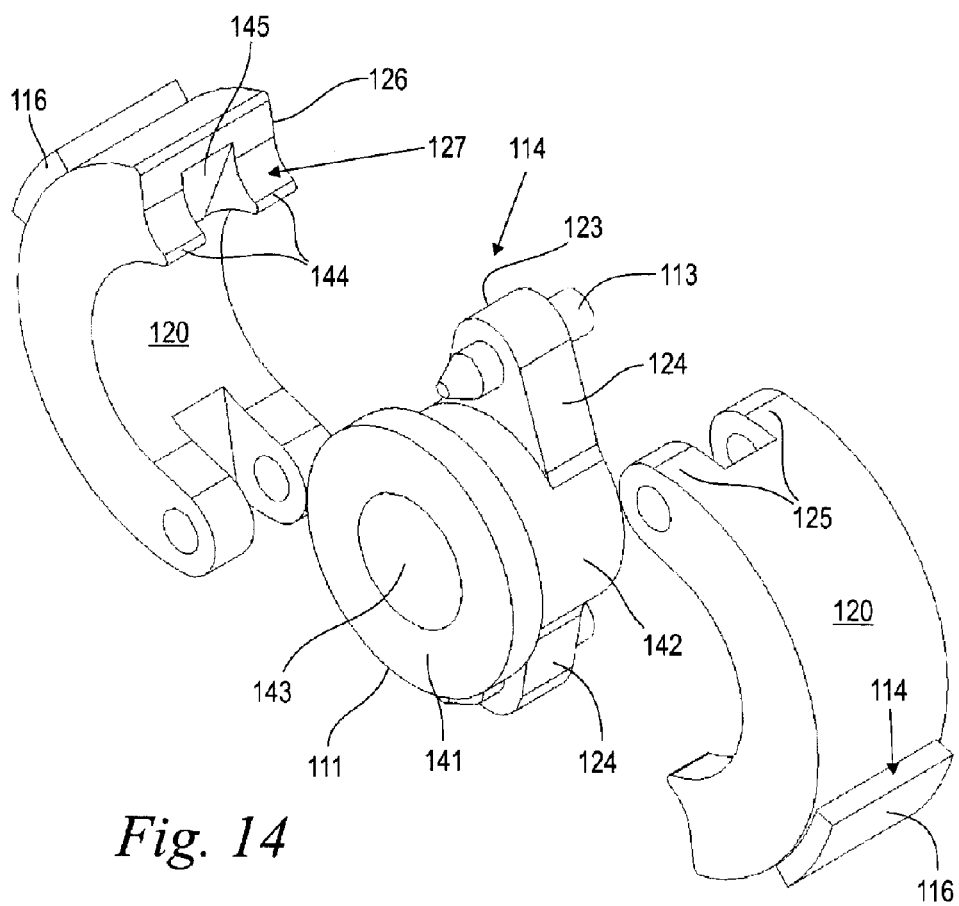
FIG. 14 is an exploded view of the arrangement according to FIG. 13 with details of the guided pivoting support of the fly bodies.

On the support body 111, two oppositely positioned, radially outwardly projecting bearing legs 124 are formed of which in the illustrated perspective drawing only one bearing leg 124 is visible. The other bearing leg 124 is illustrated in FIG. 14. The two fly bodies 120 have on one end, respectively, two securing legs 125 that form a fork arrangement engaging the correlated bearing leg 124 on both sides. A correlated hinge pin 113 extends through the bearing leg 124 and the securing legs 125. The hinge pin 113 is connected by pressing to the bearing leg 124; the two securing legs 125 glide on the respective hinge pin 113. In this way, a hinge bearing 128 for the fly bodies 120 is formed. Upon rotational movement of the illustrated arrangement generating a centrifugal force, the fly bodies 120 can pivot radially outwardly in the pivot direction indicated by arrow 112 about the correlated hinge pins 113 providing a pivot axis.

In the illustrated embodiment of the rest position without radial deflection of the fly bodies 120, a free end 126 rests against a stop 123 that limits the pivot movement of the fly bodies 120 radially inwardly. The stop 123 in the illustrated embodiment is formed by the bearing leg 124 of the neighboring fly body 120 but can also be formed by other components of the support body 111 or of the adjoining fly body 120. On the free end 126 positive-locking guide means 127 are provided which in connection with FIG. 14 will be explained in more detail.

An exploded view of the arrangement according to FIG. 13 is illustrated in FIG. 14. Accordingly, the support member 111 on the side facing the rolling bearing 130 (FIG. 12) has a flange 141 that is formed as a unitary part thereof. Two opposed bearing legs 124 radially project from the base member 142 of the support 111. The number of bearing legs 124 corresponds to the selected number of fly bodies 120. A pin 113 is pressed into each one of the two bearing legs 124. At the inner side, the support member 111 is provided with a threaded bore 143 by means of which it can be screwed onto the shaft stub 129 according to FIG. 12.

The bearing legs 124 and the securing legs 125 are provided with parallel extending a really adjoining lateral walls so that, in addition to the guiding action on the hinge pin 113, a lateral guiding action of the fly bodies 120 results. A free pivoting end 126 of the fly body 120 is designed at its radial inner side such that a central recess 145 is delimited by two lateral projections 114 forming a fork. In the mounted state, the fork projections 114 engage from below the securing legs 125 of the neighboring fly body 120 and engage laterally the sides of the correlated bearing leg 124 that is fixed on the support member. Accordingly, positive-locking guide means 127 for the free end 126 are formed that enable a pivot movement in the pivot direction 112 (FIG. 13) without allowing undesirable deflection in a different direction.

The fly bodies 120 are provided on their outer side with a friction coating 116 that is minimally elastic. Together with the stops 123, the minimum elasticity of the friction coating 116 in the radial direction provides means 114, explained in more detail in connection with FIG. 15, for static pressing of the fly bodies 120 against the illustrated circumferential wall 109 of the drum 108.

Figure 15:
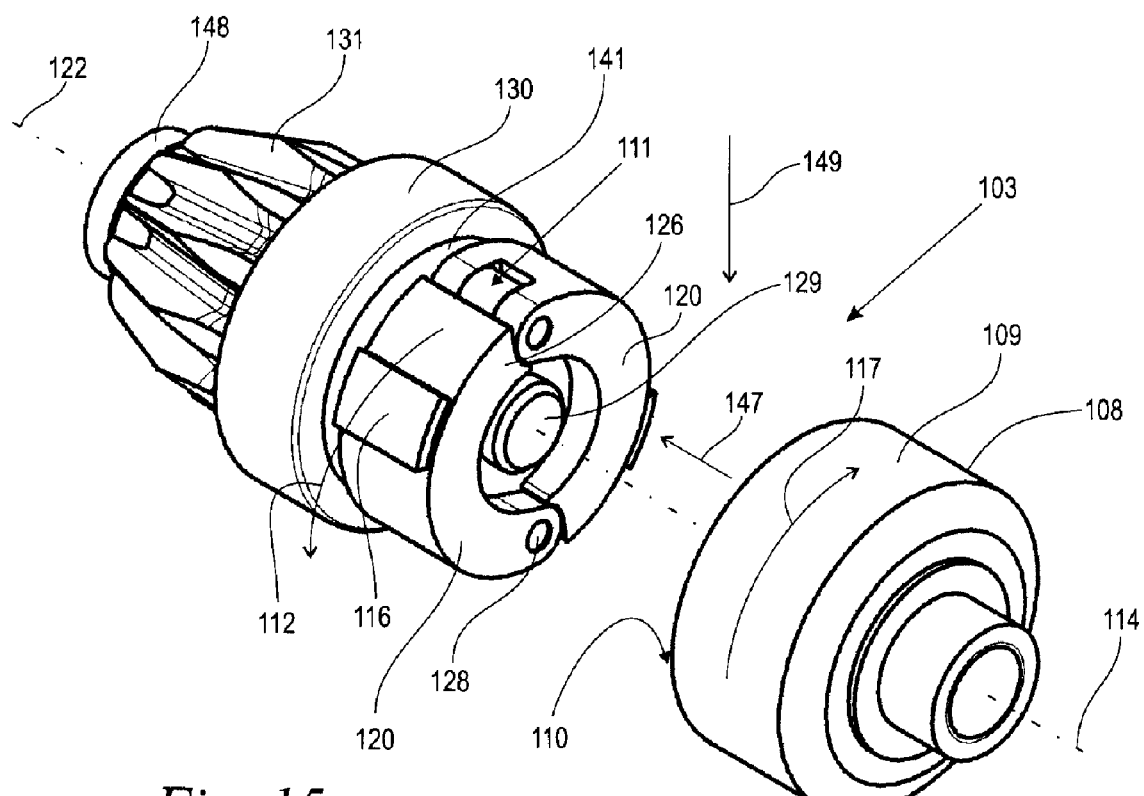
FIG. 15 is a perspective view of the shaft stub according to FIG. 12 with mounted fly body arrangement according to FIG. 13; the drum has been removed.

FIG. 15 shows in a perspective view the assembly of the shaft stub 129 with the input pinion 131, the rolling bearing 130, and the overload protection 103, with the drum 108 having been removed so as not to obfuscate the drawing. In the mounted state, the drum 108 is pushed in the direction of arrow 147 such onto the assembly of the fly bodies 120 that the fly bodies 120 with their outer friction coatings 116 are surrounded by the circumferential wall 109 of the drum 108. The support body 111 is screwed such onto the shaft stub 129 with its threaded bore 143 (FIG. 14) that the flange 141 presses the inner ring of the rolling bearing 130 into direct contact against the input pinion 131. The inner ring of the rolling bearing 103 and the input pinion 131 are secured by being clamped between the flange 141 and the collar 148.

The drum 108 is rotated in operation by the electric motor 104 (FIG. 12) in an operating rotary direction indicated by arrow 117. Relative to the operational rotary direction 117 the two fly bodies 120 are supported on the hinge bearing 128, respectively, such that the free ends 126 of the fly bodies 120 beginning at the hinge bearing 128 point in the operating rotary direction 117. This corresponds to a so-called trailing arrangement of the fly members 120 according to which their outwardly oriented pivot direction 112 is directed opposite to the operational rotary direction 117.

The axis of rotation 122 of the illustrated arrangement in the usual operating position of the angle grinder according to FIG. 12 is approximately horizontal or at least positioned at a significant angle relative to a gravitational force indicated by arrow 149. In connection with the arrangement of a total of at least two fly bodies 120, this means that at least one of the fly bodies 120, because of its weight, is pivoted outwardly in the pivot direction 112 and therefore will rest against the inner surface 110 of the drum 108, respectively, its circumferential wall 109. This contact caused by the weight force is present also in the rest state or in the state of blocked rotational standstill of the shaft stub 129. The corresponding fly body 120 is pressed statically, i.e., without dynamic effects such as centrifugal force or the like, against the circumferential wall 109 of the drum 108. The substantially horizontal arrangement of the axis of rotation 122 and of the hinge bearing 128 provides means 114 for static pressing of the fly bodies 120 against the drum 108, respectively.

The cooperation of the stops 123 with the neighboring fly bodies 120, described in connection with FIG. 14, in combination with the engagement of the fly bodies 120 in the drum 108 with slight radial pretension creates additional means 114 for static pressing of the fly bodies 128 against the circumferential wall 109. The afore described stops 123 effect in connection with a certain radial elasticity of the friction coatings 116 and an appropriate diameter of the circumferential wall 109 a minimal static pretension of the fly bodies 120 in the radial direction against the surface 110 of the circumferential wall 109. Without own rotation of the shaft stub 129, there is already a minimal frictional connection within the overload protection device 103, and this frictional connection, upon startup of the drum 108, is sufficient for entraining the shaft stub 129 and thus the tool 105 (FIG. 12). The described means 114 for static pressing of the fly bodies 120 as a result of their spatial alignment and the radial pretension act together in the illustrated embodiment. It can also be expedient to provide alternatively only one of the two means 114.

Looking simultaneous at FIGS. 12 and 15, the function of the machine tool with overload protection device 103 is as follows. For starting up the machine tool, the electric motor 104 is started causing the motor shaft 133 together with the drum 108 fixedly mounted thereon to rotate in the operating rotary direction 117. The initially stationary assembly at the output side 119 of the overload protection device 103 begins to rotate without the effect of centrifugal forces in that the drum 108, by means of frictional contact of statically pretensioned frictional coatings 116 pressed against the drum 108, will entrain the assembly of the overload protection device 103 at the output side. Upon acceleration of the tool 105 from standstill, there are first no outer loads. Within the overload protection device 103, torque is only required for rotary acceleration. At the beginning of the rotary acceleration process at still minimal rotary speed, only minimal centrifugal forces act on the fly bodies 120.

The friction forces acting on the frictional coatings 116 act in the operational rotary direction 117. In addition to the fly bodies 120 being entrained, this result in a force loading of the fly bodies 120 with a force component that acts opposite to the pivot direction 112. This force component that cancels the frictional connection is compensated by the above described means 114 for static pressing of the fly bodies 120 against the drum such that a frictional connection between the frictional coatings 116 and the drum 108 sufficient for the acceleration process remains in effect.

With increasing rotary speed centrifugal forces are generated on the fly bodies 120 that increase the pressing force and thus the frictional connection between the frictional coatings 116 and the drum 108. The illustrated arrangement is adjusted such that within a predetermined operating rpm range a maximum operating torque can be transmitted.

Inasmuch as a cutting feed is selected for the tool 105 that is too great, a pressing force that is too high occurs, or the rpm of the tool spindle 102 and thus of the fly bodies drops below a constructively predetermined limit because the tool impacts a cutting obstacle, the frictional connection caused by centrifugal force between the output side 119 and the drive side 118 will also drop. The load-caused high torque effects slipping between the fly bodies 120 and the drum 108. The slip forces the fly bodies 120 counter to the pivot direction 112 inwardly so that the frictional connection between the drive side 118 and the output side 119 is almost completely canceled. There remains a constructively predetermined frictional connection corresponding to the static pressing force of the fly bodies 120. This friction can be selected such that in the separated state the remaining residual load will not damage the drive train at the motor side and a safe guiding of the machine tool is still provided.

The same holds true also in the case where the tool spindle 102 is blocked by means of a blocking device 129 for a tool exchange. For an accidental starting of the electric motor 104, only the drum 108 is rotated wherein the minimal friction forces at the output side 119 that is standing still do not lead to any adverse effect. As soon as the cause for the blockage or overload of the tool 5 or of the tool spindle 102 has been removed, the arrangement can then again rev up and reach higher rpm.

While specific embodiments of the invention have been shown and described in detail to illustrate the inventive principles, it will be understood that the invention may be embodied otherwise without departing from such principles.

What is claimed is:

1. An overload protection device for an electrically operated machine tool having an electric motor and a drive train for driving a tool, wherein the drive train comprises a gearbox, wherein the overload protection device comprises:
   a drum having a circumferential wall;
   at least one fly body engaging the circumferential wall of the drum;
   wherein the drum and the at least one fly body are mounted in the drive train between the electric motor and the gearbox;
   wherein the drum is arranged at an input side of the drive train and the at least one fly body is arranged at an output side of the drive train.

2. The overload protection device according to claim 1, comprising means for statically pressing the at least one fly body against the circumferential wall of the drum.

3. The overload protection device according to claim 2, wherein the overload protection device is arranged in the machine tool such that an axis of rotation of the overload protection device relative to a working position of the machine tool is substantially in a horizontal position and the at least one fly body is forced by gravity against the circumferential wall.

4. The overload protection device according to claim 2, wherein the means for statically pressing the at least one fly body against the circumferential wall of the drum comprise a radial stop, wherein the at least one fly body has a radially outwardly positioned friction coating pressed by the radial stop against the circumferential wall of the drum.

5. The overload protection device according to claim 1, further comprising a support member having a bearing leg, wherein the at least one fly body has two spaced apart securing legs engaging opposed sides of the bearing leg, wherein a ginge pin is provided that penetrates the bearing leg and the securing legs.

6. The overload protection device according to claim 1, wherein the at least one fly body has a first end that is pivotably supported and has a second free end provided with positive-locking guide means.

7. The overload protection device according to claim 6, further comprising a hinge bearing that pivotably supports the at least one fly body, wherein the second free end, beginning at the hinge bearing, points in an operational rotary direction of the drum.

8. The overload protection device according to claim 1, further comprising a support member on which the at least one fly body is supported, wherein the drive train comprises shaft stub arranged between the overload protection device and the gearbox, wherein the shaft stub is supported by a rolling bearing, wherein the rolling bearing is secured between the support member and an in put pinion of the gearbox.

9. An electrically driven machine tool comprising an overload protection device according to claim 1.

* * * * *